(12) United States Patent
Mandel et al.

(10) Patent No.: US 11,654,623 B2
(45) Date of Patent: May 23, 2023

(54) ADDITIVE MANUFACTURING SYSTEM WITH LAYERS OF REINFORCING MESH

(71) Applicant: Xerox Corporation, Norwalk, CT (US)

(72) Inventors: Barry P. Mandel, Fairport, NY (US); David A. Mantell, Rochester, NY (US); Chu-Heng Liu, Penfield, NY (US); Mandakini Kanungo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1996 days.

(21) Appl. No.: 14/938,227

(22) Filed: Nov. 11, 2015

(65) Prior Publication Data

US 2017/0129179 A1   May 11, 2017

(51) Int. Cl.
| | |
|---|---|
| *B29C 64/236* | (2017.01) |
| *B33Y 10/00* | (2015.01) |
| *B29C 64/165* | (2017.01) |
| *B29C 64/314* | (2017.01) |
| *B33Y 40/00* | (2020.01) |
| *B33Y 30/00* | (2015.01) |
| *B33Y 50/02* | (2015.01) |
| *B29K 105/08* | (2006.01) |
| *B29K 105/12* | (2006.01) |

(52) U.S. Cl.
CPC .......... *B29C 64/165* (2017.08); *B29C 64/236* (2017.08); *B29C 64/314* (2017.08); *B33Y 40/00* (2014.12); *B29K 2105/08* (2013.01); *B29K 2105/12* (2013.01); *B33Y 10/00* (2014.12); *B33Y 30/00* (2014.12); *B33Y 50/02* (2014.12)

(58) Field of Classification Search
CPC ... B29C 64/188; B29C 64/104; B29C 70/688; B29C 70/38; B29C 70/685; B29C 70/687; B29C 70/224; B29C 70/226; B32B 5/028; B32B 37/15
See application file for complete search history.

(56) References Cited

U.S. PATENT DOCUMENTS 3,324,213 A * 6/1967 Anfinset ................. B28B 19/00
264/71
3,332,831 A * 7/1967 Stoller ................ B29C 65/5042
156/306.6

(Continued)

FOREIGN PATENT DOCUMENTS

| WO | 2013136096 A1 | 9/2013 |
| WO | 2014193505 A1 | 12/2014 |
| WO | 2015009938 A1 | 1/2015 |

*Primary Examiner* — Andrew D Graham
(74) *Attorney, Agent, or Firm* — Maginot Moore & Beck LLP

(57) ABSTRACT

A three-dimensional object printer includes a controller that operates at least one ejector to place a layer of photopolymer material on a substrate. The controller is configured to cure the ejected photopolymer layer partially and position fiber on the cured layer before continuing to eject photopolymer material onto the fibers. The fibers can be loose or organized into a mesh. The pieces of mesh position on a cured layer can be pre-cut or a cutting device can be operated to cut pieces of mesh having a shape that corresponds to the shape of the layer of photopolymer material. The fibers reinforce the layers of photopolymer material and add strength and durability to the overall part being formed with the photopolymer material.

9 Claims, 5 Drawing Sheets

(56) References Cited

U.S. PATENT DOCUMENTS

| | | | | |
|---|---|---|---|---|
| 3,932,249 A * | 1/1976 | Jury | ....................... | B29C 70/26 |
| | | | | 156/213 |
| 4,759,893 A * | 7/1988 | Krauter | ............... | B29C 37/0064 |
| | | | | 264/258 |
| 5,059,266 A * | 10/1991 | Yamane | ................. | B29C 41/08 |
| | | | | 118/313 |
| 5,149,548 A * | 9/1992 | Yamane | ............... | B29C 67/247 |
| | | | | 118/315 |
| 5,185,048 A * | 2/1993 | Guerif | ................... | B01D 61/50 |
| | | | | 156/250 |
| 5,260,009 A * | 11/1993 | Penn | ..................... | H05K 3/125 |
| | | | | 264/401 |
| 5,301,863 A * | 4/1994 | Prinz | ...................... | B22F 3/008 |
| | | | | 156/59 |
| 5,303,141 A * | 4/1994 | Batchelder | ............. | B29C 41/36 |
| | | | | 156/244.11 |
| 5,578,155 A * | 11/1996 | Kawaguchi | .......... | B29C 64/141 |
| | | | | 156/267 |
| 5,611,880 A * | 3/1997 | Onishi | ......................... | 156/234 |
| 5,637,175 A * | 6/1997 | Feygin | .................. | B33Y 30/00 |
| | | | | 156/256 |
| 6,040,094 A * | 3/2000 | Otsuka | ...................... | G03F 7/12 |
| | | | | 428/332 |
| 6,080,343 A * | 6/2000 | Kaufman | ............... | B29C 70/388 |
| | | | | 264/255 |
| 6,214,279 B1 * | 4/2001 | Yang | ....................... | B29C 41/52 |
| | | | | 264/308 |
| 6,364,986 B1 * | 4/2002 | Kieronski | ............... | B29C 39/42 |
| | | | | 156/242 |
| 6,630,093 B1 * | 10/2003 | Jones | ................... | B29C 70/088 |
| | | | | 264/136 |
| 7,236,166 B2 * | 6/2007 | Zinniel | ................. | B33Y 30/00 |
| | | | | 264/340 |
| 9,440,397 B1 * | 9/2016 | Fly | ........................ | B33Y 10/00 |
| 2006/0065355 A1 * | 3/2006 | Chiu | ....................... | B32B 38/10 |
| | | | | 156/247 |
| 2007/0023975 A1 * | 2/2007 | Buckley | ................. | B29B 11/16 |
| | | | | 264/494 |
| 2008/0315461 A1 * | 12/2008 | Henningsen | .......... | B29C 64/106 |
| | | | | 264/401 |
| 2012/0258250 A1 * | 10/2012 | Rodgers | .............. | B29C 67/0055 |
| | | | | 427/402 |
| 2013/0056672 A1 * | 3/2013 | Johnston | ............... | B22F 3/1055 |
| | | | | 252/62.54 |
| 2014/0020192 A1 * | 1/2014 | Jones | ..................... | A43B 13/14 |
| | | | | 12/146 B |
| 2014/0050921 A1 | 2/2014 | Lyons et al. | | |
| 2014/0252672 A1 | 9/2014 | Rael | | |
| 2014/0268604 A1 * | 9/2014 | Wicker | ................. | B29C 70/885 |
| | | | | 361/760 |
| 2014/0291886 A1 * | 10/2014 | Mark | .................... | B29C 64/106 |
| | | | | 264/163 |
| 2014/0361460 A1 | 12/2014 | Mark | | |
| 2015/0096266 A1 * | 4/2015 | Divine | .................. | B33Y 50/02 |
| | | | | 53/452 |
| 2015/0136455 A1 * | 5/2015 | Fleming | ................ | B29C 64/106 |
| | | | | 174/255 |
| 2015/0140220 A1 * | 5/2015 | Palone | .................. | B29C 59/005 |
| | | | | 427/355 |
| 2015/0141234 A1 * | 5/2015 | Sander | .................... | B29C 64/20 |
| | | | | 501/1 |
| 2015/0231825 A1 * | 8/2015 | Swartz | ..................... | B32B 5/26 |
| | | | | 428/156 |
| 2015/0291833 A1 * | 10/2015 | Kunc | .................. | B29C 67/0055 |
| | | | | 428/413 |
| 2015/0336292 A1 * | 11/2015 | Mikulak | ................. | B29B 9/06 |
| | | | | 428/402 |
| 2015/0367576 A1 * | 12/2015 | Page | ....................... | B29C 70/30 |
| | | | | 264/257 |
| 2016/0082695 A1 * | 3/2016 | Swartz | .................. | B29C 70/42 |
| | | | | 428/172 |
| 2016/0114532 A1 * | 4/2016 | Schirtzinger | ........... | B29C 70/30 |
| | | | | 428/411.1 |
| 2016/0318247 A1 * | 11/2016 | Schlachter | .......... | B29C 67/0055 |
| 2017/0028633 A1 * | 2/2017 | Evans | ................... | B29C 70/382 |
| 2017/0210074 A1 * | 7/2017 | Ueda | ..................... | B33Y 80/00 |
| 2017/0232703 A1 * | 8/2017 | Hawley | ................. | B29C 70/688 |
| | | | | 428/109 |
| 2017/0275794 A1 * | 9/2017 | Onodera | ................ | D04H 3/045 |

* cited by examiner

ADDITIVE MANUFACTURING SYSTEM WITH LAYERS OF REINFORCING MESH

TECHNICAL FIELD

The device disclosed in this document relates to printers that produce three-dimensional objects and, more particularly, to systems and methods for reinforcing such objects.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

Current three-dimensional printers have significant limitations with regard to the viscosity range of the materials that can be ejected, with most materials having an upper limit between 10 and 20 centipoise (cP). The printers that eject liquid photopolymers that are cured are limited to the upper end of this range. Consequently, objects made with these materials may be too delicate and consequently limited in their functionality. Other additive manufacturing methods such as Fused Deposition Modeling (FDM) or Selective Laser Sintering (SLS) can use a wider range of materials and thus are capable of producing products that are more durable than the objects made from cured photopolymer materials. Therefore, a system capable of producing objects with cured photopolymer materials that are as durable as objects by the FDM and SLS methods would be advantageous.

SUMMARY

A manufacturing method that embeds fibers or one or more pieces of mesh in a three-dimensional structure during an additive manufacturing process of the structure increases the robustness and durability of the structure. The method includes operating with a controller at least one ejector in a plurality of ejectors to form at least one layer of a photopolymer material on a substrate, operating with the controller a source of ultraviolet (UV) radiation to cure the at least one layer of photopolymer partially, operating with the controller an actuator to position fibers onto a top surface of the at least one layer of partially cured photopolymer, and operating with the controller the at least one ejector to eject additional photopolymer material onto the fibers to form at least one other layer of photopolymer material on the fibers.

A system that embeds fibers or one or more pieces of mesh in a three-dimensional object during an additive manufacturing process of the structure increases the robustness and durability of the structure. The system includes a substrate, a plurality of ejectors configured to eject drops of photopolymer material towards the substrate, a source of ultraviolet (UV) radiation that emits radiation to cure the photopolymer material ejected from the plurality of ejectors, an actuator configured to position fibers on photopolymer material supported by the substrate, and a controller operatively connected to the plurality of ejectors, the source of radiation, and the actuator. The controller is configured to operate at least one ejector in the plurality of ejectors to form at least one layer of the photopolymer material on the substrate, operate the source of UV radiation to cure the at least one layer of photopolymer material partially, operate the actuator to position fibers on a top surface of the at least one layer of the partially cured photopolymer material, and operate the plurality of ejectors to eject additional photopolymer material onto the fibers to form at least one other layer of photopolymer material on the fibers.

BRIEF DESCRIPTION OF THE DRAWINGS

The foregoing aspects and other features of a system that embeds fibers or one or more pieces of mesh in an additive manufactured three-dimensional object are explained in the following description, taken in connection with the accompanying drawings.

DETAILED DESCRIPTION

Figure 1:
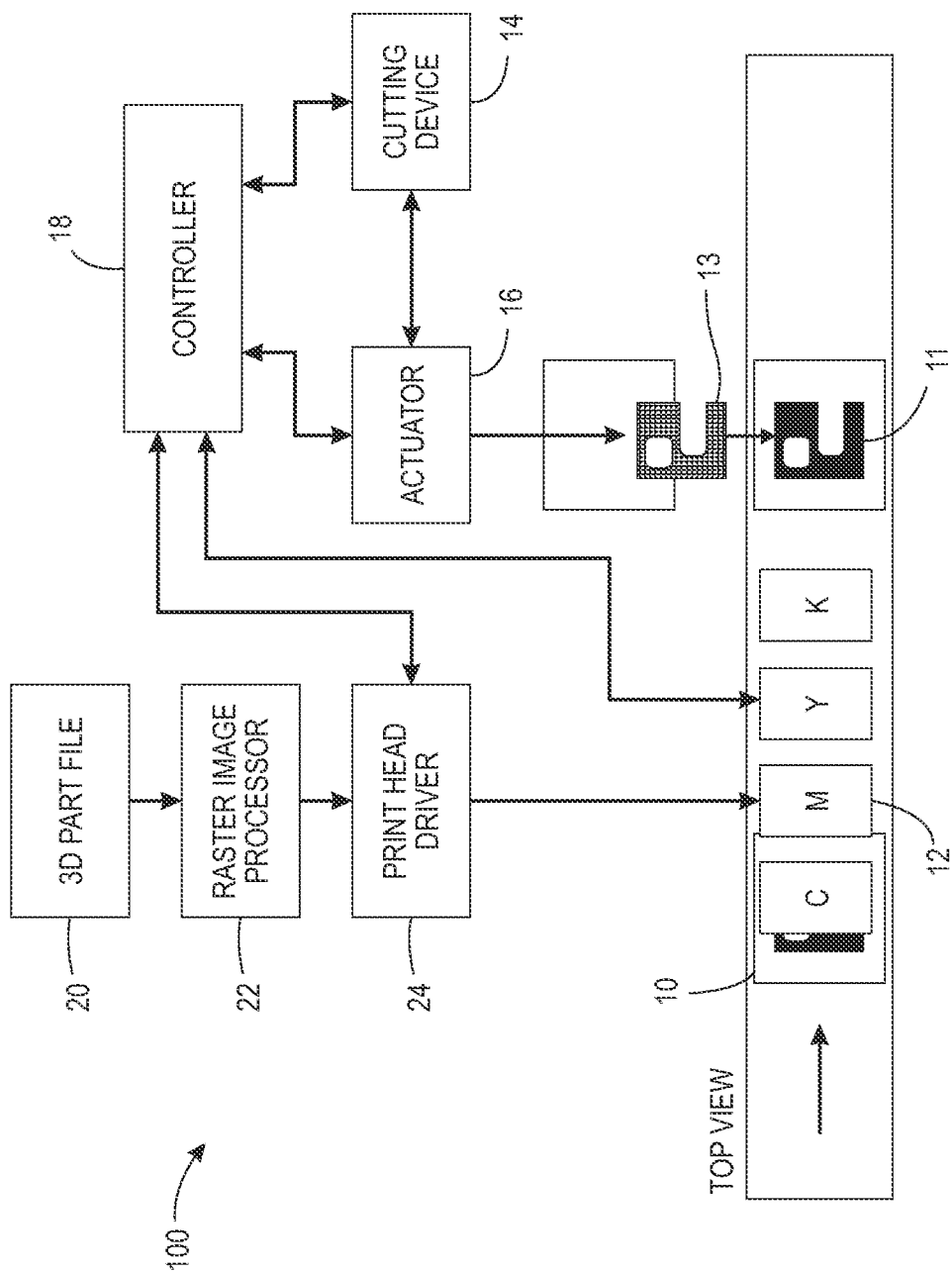
FIG. 1 illustrates a top-down view of a system for forming a three-dimensional structure using an additive manufacturing method that has the ability to custom cut mesh pieces during the building process.

For a general understanding of the environment for the system and method disclosed herein as well as the details for the system and method, reference is made to the drawings. In the drawings, like reference numerals designate like elements.

Figure 2:
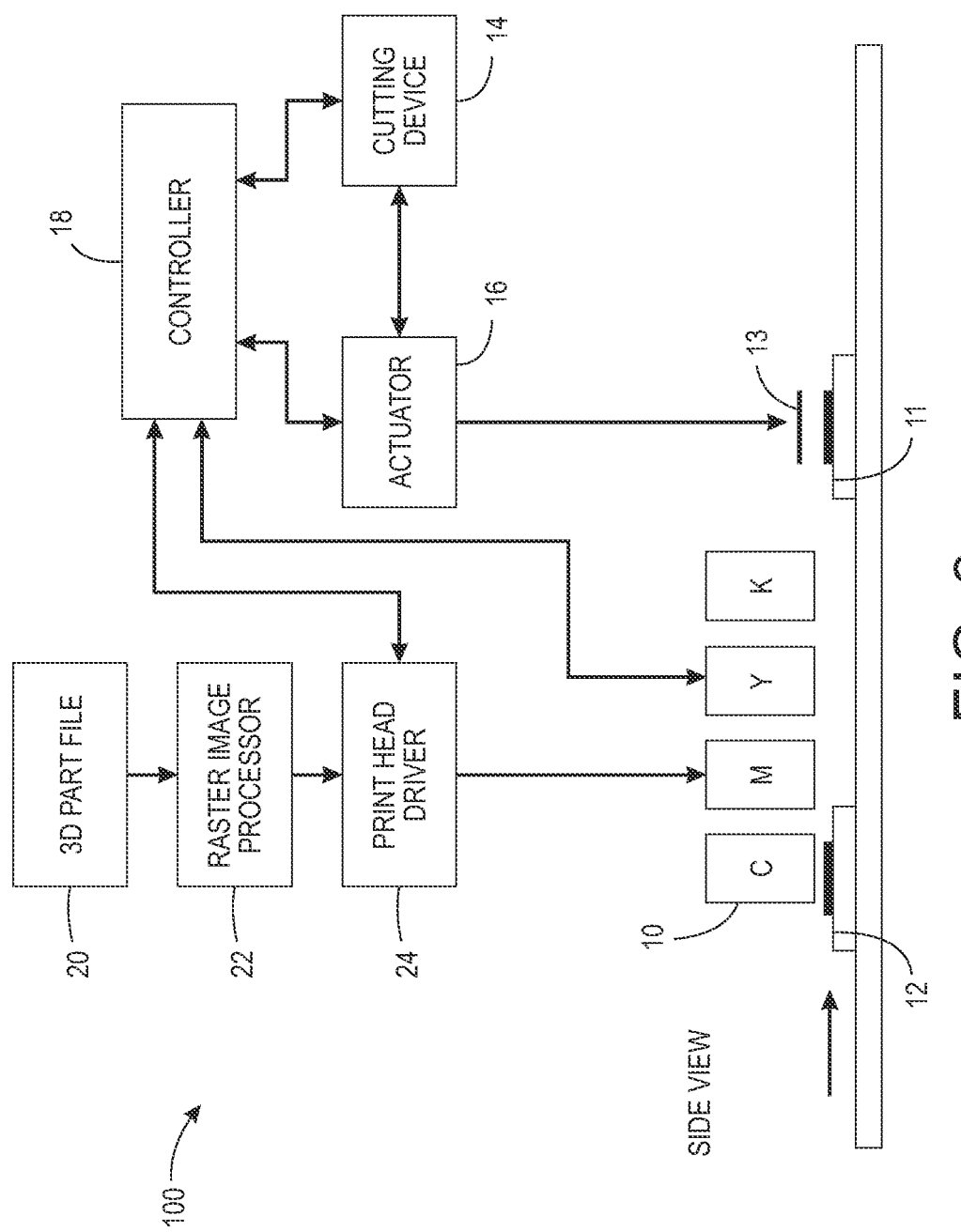
FIG. 2 illustrates a side view of the system shown in FIG. 1.

FIGS. 1 and 2 illustrate a system for forming a three-dimensional structure using an additive manufacturing method that has the ability to embed fibers or pieces of mesh in the structure during the building process. As used in this document, the term "fibers" refers a collection of filaments of one or more materials useful for imparting durability or tensile strength to the manufactured structure. As used in this document, "mesh" refers to a plurality of fibers that are organized to run in at least two different directions and which hold together to form an entity that is permeable to some degree of air and light. The printer 100 includes a substrate 10, at least one ejector 12, a cutting device 14, an actuator 16, a controller 18, a raster image processor 22 that generates raster data and a printhead driver 24. A three-dimensional part file 20, such as that produced by a computer-aided design (CAD) system, is received by a three-dimensional raster image processor 22, which generates raster image data for the layers to be printed to form the part 11. The raster image processor 22 passes the raster image data to the printhead driver 24 and the driver generates the pixelated data for operating the at least one ejector 12 as well as sending the data to the controller 18. The at least one ejector 12 is configured to eject drops of a photopolymer material towards the substrate 10, such that the drops form a layer of photopolymer material on top of the substrate 10.

As shown in FIG. 1, multiple ejectors can be provided in succession and the part 11 is moved through the line of ejectors to receive drops of photopolymer material from each. The cutting device 14 is configured to cut a mesh material into virtually any shape. The actuator 16 is configured to move at least one piece of mesh material 13 from the cutting device 14 towards the substrate. The purpose of the at least one piece of mesh material 13 is to increase part robustness and strength by inserting at least one piece of mesh material 13 in between layers of the part. The mesh acts as a support structure within the part, and may be placed throughout the entire part or selectively placed at only high stress areas within the part. The mesh material may be made of any material that is strong enough to support the cured part. These materials include, but are not limited to, metals, such as nickel and stainless steel, and high strength plastics.

The controller 18 is operatively connected to the printhead driver 24, the at least one ejector 12, the cutting device 14 and the actuator 16. The controller 18 is configured to operate the various components of the system. Controller 18 is configured, for example, as a self-contained, dedicated computer having a central processor unit (CPU) with electronic storage, and a display or user interface (UI). Controller 18 can also be configured with general or specialized programmable processors that execute programmed instructions stored in a memory operatively connected to the controller. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

First, the controller operates the at least one ejector 12 to eject drops of photopolymer material to form at least one layer of photopolymer material on the substrate 10. The controller 18 may operate the at least one ejector 12 to add as many layers as required by the three-dimensional part file 20 or as desired by the user before theephotopolymer material is cured. Once the photopolymer material is cured, at least one piece of mesh material 13 is positioned on the top layer of the photopolymer material. The controller 18 can also operate the cutting device 14 with reference to the processed data used to operate the at least one ejector 12 to cut the mesh material into one or more pieces of mesh 13 having a shape that corresponds to a portion of the at least top layer of cured photopolymer material. The resulting at least one piece of mesh material 13 is cut into a shape or shapes that correspond to the general cross-sectional shape of the top layer of the part 11 as shown in the embodiment of FIG. 1. Having a piece of mesh material 13 with a shape that is substantially similar to the shape of the top layer of the part maximizes the surface area of the top layer that the piece of mesh material 13 contacts. This maximization of the contact area enhances the structural integrity and durability of the part. The processed data used to operate the at least one ejector 12 can be used by the controller 18 to operate the cutting device 14 to cut multiple mesh pieces 13 that are individually placed onto the top layer of the part. The cutting device 14 is configured to cut the mesh material using various methods of cutting that are known to those skilled in the art. In one embodiment, the cutting device 14 is a laser cutting system and in another embodiment, the cutting device 14 is a reciprocating blade system operatively connected to an actuator configured to move the reciprocating blade system in response to signals received from the controller 18 to cut the mesh into shapes corresponding to the data used to operate the ejectors that formed the part. That is, the controller 18 operates the actuator 16 in the positive and negative X, Y and Z directions to move the at least one piece of mesh material 13 from the cutting device 14 to a top surface of the at least one layer of cured photopolymer material. To aid in strengthening the part, the controller 18 can also operate the actuator 16 to vary the orientation of the mesh pieces within a layer or in different layers. Finally, the controller 18 operates the at least one ejector 12 to add additional layers after the at least one piece of mesh material 13 is added to the top layer of cured photopolymer material to form at least one other layer of photopolymer material on top of the at least one piece of mesh material 13. The mesh piece or pieces laid on the top surface of the cured photopolymer need not conform to the boundaries of the top layer. For example, a portion of the mesh piece or pieces can extend beyond the edges of the top layer. The extension portion of a piece can be used to manipulate the part during production or used as support for material to be ejected later. Once the part is completed, the extensions of the mesh pieces can be removed by known processes. The process of adding layers and mesh pieces is continued until the three-dimensional part 11 is completed.

Figure 3:
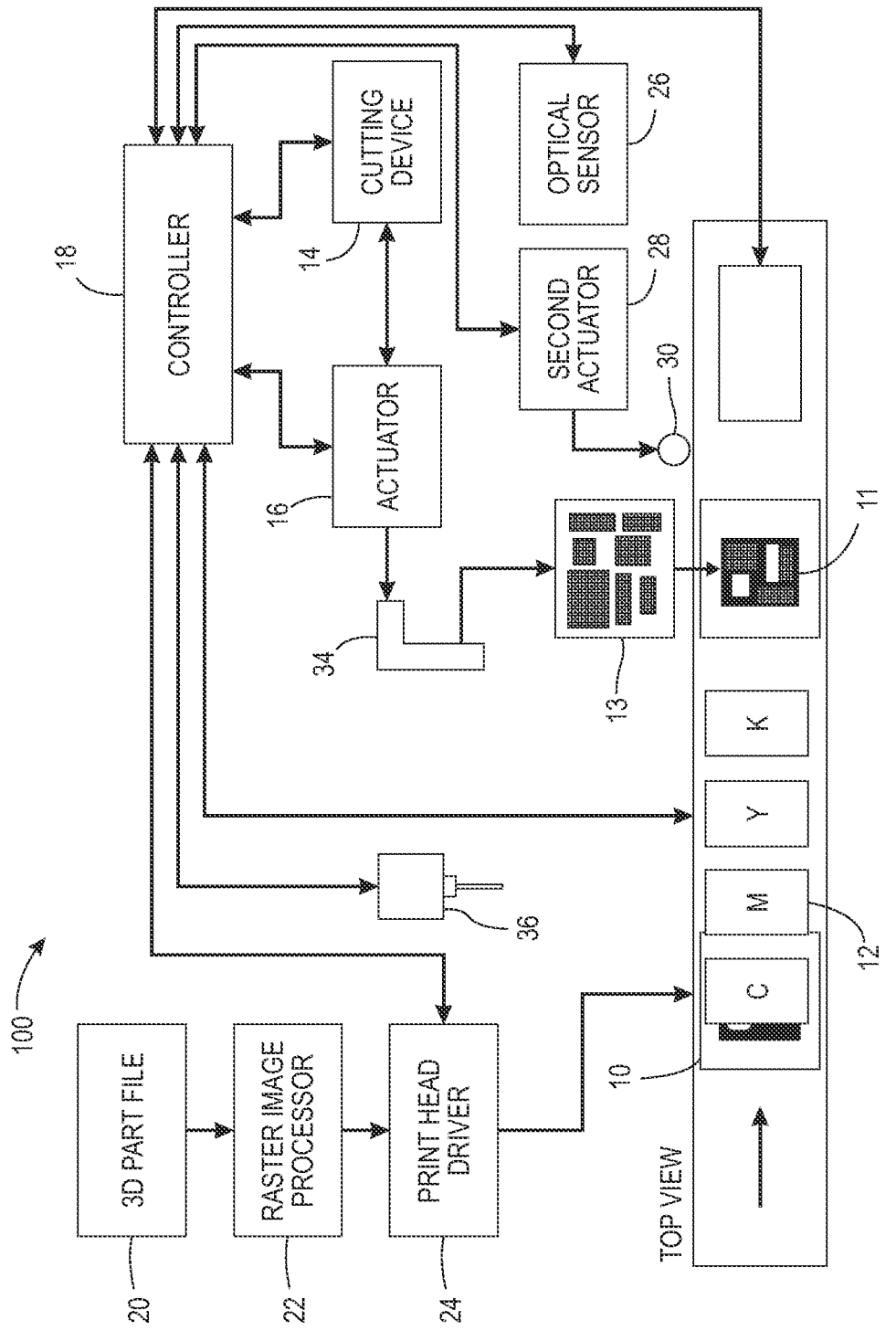
FIG. 3 illustrates a top-down view of the system shown in FIG. 1 comprising additional elements according to further embodiments of the invention.

Several additional embodiments of the aforementioned system are disclosed below. In one embodiment, as shown in FIG. 3, the system further comprises an optical sensor 26 configured to generate image data of at least one layer of the photopolymer material forming an object. The controller 18 is operatively connected to the optical sensor 26 to receive image data generated by the optical sensor 26 that corresponds to an image of the various features of the layer of photopolymer material, particularly its shape. These image data are sent to the controller 18, which generates signals for operating the cutting device 14 and the at least one ejector 12. The cutting device 14 then cuts the next piece of mesh material 13 to the desired specifications corresponding to the signals based on the image data generated by the optical sensor 26 sent from the controller 18. The controller 18 may also take these data and operate the at least one ejector 12 to account for variations in the top surface of the layer of cured photopolymer material produced by the addition of the at least one piece of mesh material 13. When the at least one piece of mesh material 13 is added to the top surface of the layer of cured photopolymer material, ridges or bumps may develop around the mesh. Also, the mesh itself may be raised above the plane of the top surface of the layer of cured photopolymer material. Therefore, the layer of photopolymer material that is to be added on top of the mesh must account for these deformities in the top layer surface. The optical sensor 26 captures this information and generates image data corresponding to this information, which is sent to the controller 18. As noted above, the mesh material is permeable so the build and support material can fill the interstitial space within the mesh material and the amount of ejected material can be varied by location to level the top surface in the next photopolymer layer. Thus, controller 18 operates the at least one ejector 12 with reference to these image data to add more photopolymer material in some areas and less in others to achieve a flat top surface on the next layer of photopolymer material.

As noted above, the controller 18 can be configured to generate signals for operating the cutting device 14 with reference to image data used by the controller 18 to operate the at least one ejector 12 for forming the at least one layer of photopolymer material. In this configuration, the image data used by the controller 18 for each layer comes directly from the three-dimensional part file 20. Image data does not come from the actual part 11 being constructed, and thus does not show any possible minute imperfections or unintended alterations that may have occurred during the building process. Similar to the previously discussed embodiment, the image data are used by the controller 18 to operate the cutting device 14 to cut each mesh piece 13. Additionally, the controller 18 may take this image data from the part file and modify it with empirically determined data corresponding to variations in the top surface of the layer of photopolymer material in which at least one piece of mesh material 13 has been embedded. This empirically determined data corresponding to imperfections and ridges in the top surface of the layer of photopolymer material in which a mesh piece has been embedded is stored in the memory with the part file 20 before the building process begins. The controller 18 then takes this empirically determined data and operates the at least one ejector 12 to add more photopolymer material in some areas and less material in other areas to achieve a flat top surface on the next layer of photopolymer material.

These imperfections in the layer of photopolymer material applied over the mesh piece or pieces may be compensated using other methods as described in the following embodiments. In one embodiment, the system 100 as shown in FIG. 3 may further comprise a second actuator 28 configured to move a plate or roller 30 with reference to the substrate 10. The controller 18 is operatively connected to the second actuator 28 and is further configured to operate the second actuator 28 to press the plate or roller 30 into the layer of photopolymer covering the at least one piece of mesh material. When the plate or roller 30 is pressed into the layer of photopolymer covering the at least one piece of mesh material 13, it pushes the photopolymer material into the at least one piece of mesh material 13. Once the layer of photopolymer material is pushed into the mesh piece or pieces, the at least one piece of mesh material 13 is positioned slightly below, slightly above, or completely flush with the top surface of the layer of photopolymer material applied over the mesh piece or pieces. This positioning ensures that the top surface of the layer of photopolymer material is relatively flat and thus ready to receive the next layer of photopolymer material from the at least one ejector 12. The plate or roller 30 may consist of a cylindrical rolling device that rolls over the layer of photopolymer material and the at least one piece of mesh material 13. The plate or roller 30 may also consist of a warm plate that is pushed into the layer of photopolymer material and the at least one piece of mesh material 13 to warm the photopolymer layer to help adhere the at least one piece of mesh material 13 to the layer of photopolymer material applied to the mesh and level the top layer of the photopolymer material.

In another embodiment, the imperfections in the top surface of a layer of photopolymer material applied to one or more mesh pieces are repaired with a leveler 32 configured to remove a portion of the at least one layer of photopolymer material applied to the mesh piece or pieces. The controller 18 is operatively connected to the leveler 32 and is further configured to operate the leveler 32 to remove a portion of the at least one other layer of uncured photopolymer material applied to the mesh piece or pieces. The portion to be removed from the at least one other layer of uncured photopolymer material is any portion of the top surface of the last layer that is protruding or otherwise affecting the flatness of the top surface. Once these portions are removed, the top surface of the last layer of photopolymer material is sufficiently level to have additional layers of photopolymer material added on top of it. Not every layer is required to be perfectly level since data from the optical sensor 26 or the image data from the part file can be used to account for these imperfections and operate the at least one ejector 12 to form the next layer accordingly.

Another embodiment of system 100, shown in FIG. 3, includes a robotic arm 34, which is used to position a piece or pieces of mesh on the part being manufactured. The actuator 16 is operatively connected to the robotic arm 34 to enable the controller 18 to operate the actuator 16 to move the robotic arm 34 and position the at least one mesh piece 13 onto the layer of photopolymer material. Consequently, operation of the robotic arm 34 improves the speed and efficiency of the process of placing the at least one piece of mesh material 13 onto the top surface of the layer of photopolymer material. In this embodiment, pre-cut pieces of mesh 13 can be stored on another platen or the cutting device 14 can be operated by the controller 18 to cut the pieces of mesh. To facilitate the mesh shapes conforming to areas of the part being formed, a number of pre-cut mesh pieces having different widths and lengths can be stored on the platen or the cutting device 14 can be supplied with rolls of mesh having different widths. The controller 18 then picks the pieces of mesh 13 off of the platen to place them on the part 11. Because the system 100 forms objects with curable liquid photopolymers, a source of UV radiation 36 is included in the system shown in FIG. 3. The controller 18 is operatively connected to the source of UV radiation 36 and is configured to operate the source of UV radiation 36 to cure the liquid photopolymer material ejected from the at least one ejector 12. This curing of the part 11 can be done from time to time as needed. The part can be moved away from the at least one ejector 12 to where the source of UV radiation 36 may directly hit the part 11 and cure it. The part can then be moved back into its original position so the at least one ejector 12 can be operated to continue the building process.

Figure 4:
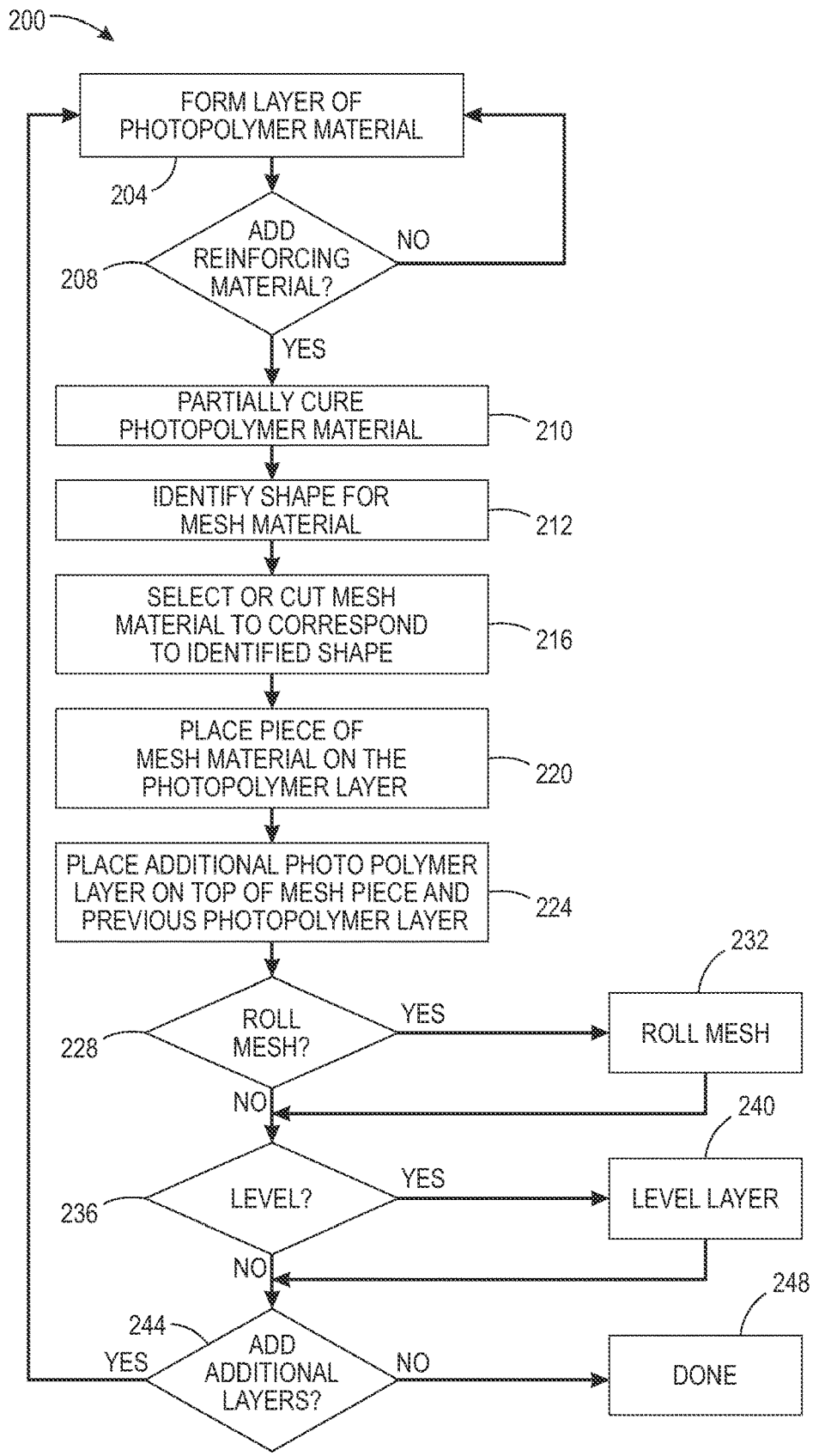
FIG. 4 is a flow diagram of an additive manufacturing method for embedding a mesh piece or a plurality of mesh pieces in a three-dimensional structure.

An additive manufacturing method 200 for embedding a mesh piece or a plurality of mesh pieces in a three-dimensional structure is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 18 noted above can be such a controller or processor. Alternatively, the controller 18 can be implemented with more than one processor and associated circuitry and components, each of which is configured to form one or more tasks or functions described herein.

The controller 18 (FIG. 1) operates at least one ejector 12 in a plurality of ejectors 12 to form at least one layer of a liquid photopolymer material on a substrate (block 204). The controller 18 then determines whether to add a piece of reinforcing mesh material 13 to the top surface of the layer of photopolymer material (block 208). If the data from the file 20 indicates no piece of mesh material is to be added, the controller 18 operates one or more ejectors 12 with image data for the next layer to form another layer of photopolymer material on top of the previous layer of photopolymer material (block 204). This determination is made with reference to image data received by the controller 18 from a three-dimensional part file 20. If the data indicates a piece of mesh material is to be added, the controller 18 operates the radiation source 36 to cure the ejected photopolymer partially (block 210). As used in this document, "partially cured" means one or more layers of photopolymer have not been fully cured by exposure to a curing radiation. The shape or outline of one or more mesh pieces are identified (block 212). The outline identification is performed by processing image data received from the three-dimensional part file 20 or by processing image data received by the controller 18 from the optical sensor 26, which is positioned to capture image data from the part 11 as it is being constructed. The controller 18 then operates a robotic arm 34 to select an appropriate mesh piece or the controller can operate cutting device 14 using either the image data from the three-dimensional part file 20 or the image data from the optical sensor 26 to cut at least one piece of mesh material 13 into the identified shape (block 216). Any method of cutting known in the art may be employed to operate the various cutting devices previously noted to cut the at least one piece of mesh material. The robotic arm 34 is then operated by the controller 18 to add one or more pieces of mesh material 13 to the top surface of the partially cured layer (block 220). The at least one piece of mesh material 13 is placed directly onto the top surface of the layer of the partially cured photopolymer material with an appropriate orientation of the filaments in the piece and is allowed to protrude above the photopolymer material. The controller 18 operates the at least one ejector 12 to eject additional photopolymer material onto the at least one piece of mesh material 13 to form at least one other layer of photopolymer material on the at least one piece of mesh material 13 (block 224). The distribution of photopolymer material to form the next layer of photopolymer material can be determined either from image data sent to the controller 18 from the three-dimensional part file 20 or from the optical sensor 26.

To address possible imperfections in the top surface of the applied layer, the controller 18 then optionally operates a second actuator 28 to press a plate or roller 30 into the applied layer of photopolymer material and the at least one piece of mesh material 13 (blocks 228 and 232). The controller 18 operates the plate or roller 30 to either roll a cylindrical rolling device over the applied layer and piece of mesh material 13 or press a plate, which may be warm, against the applied layer and the at least one piece of mesh material 13. The cylindrical rolling device pushes the applied layer of photopolymer material into the mesh material 13, helping to flatten the mesh so that the next layer of photopolymer material may be accurately added. The plate, which may be warm, pushes and flattens the mesh material 13 into the layer, as well as warming it so that it further adheres to the layer of photopolymer material.

Additionally or alternatively, the imperfections in the top layer of the applied photopolymer can be addressed by using a leveler to remove imperfections. Thus, the process continues by determining whether the applied layer should be leveled (block 236), and if it is, the controller 18 operates a leveler to remove portions of the applied layer of uncured photopolymer (block 240). The operation of the leveler 32 removes any portion of the top surface of the applied layer of photopolymer material that is protruding or otherwise affecting the flatness of the top surface of the layer. Once the optional leveling is complete, the controller 18 then determines from the image data whether to add additional layers of photopolymer material and possibly mesh material to the part 11 (block 244). If the controller 18 determines to continue adding layers, the method continues (block 204). If the controller 18 determines no additional layers are to be added to the part 11, the method is complete (block 248). At any point during the process of method 200, other than the ones noted above, the layers of photopolymer material may be optionally cured by a source of UV radiation 36. If it is determined by the controller 18 that the layer of photopolymer material needs to be cured, the controller 18 operates the source of UV radiation 36 to cure the last applied layer of photopolymer material.

Figure 5:
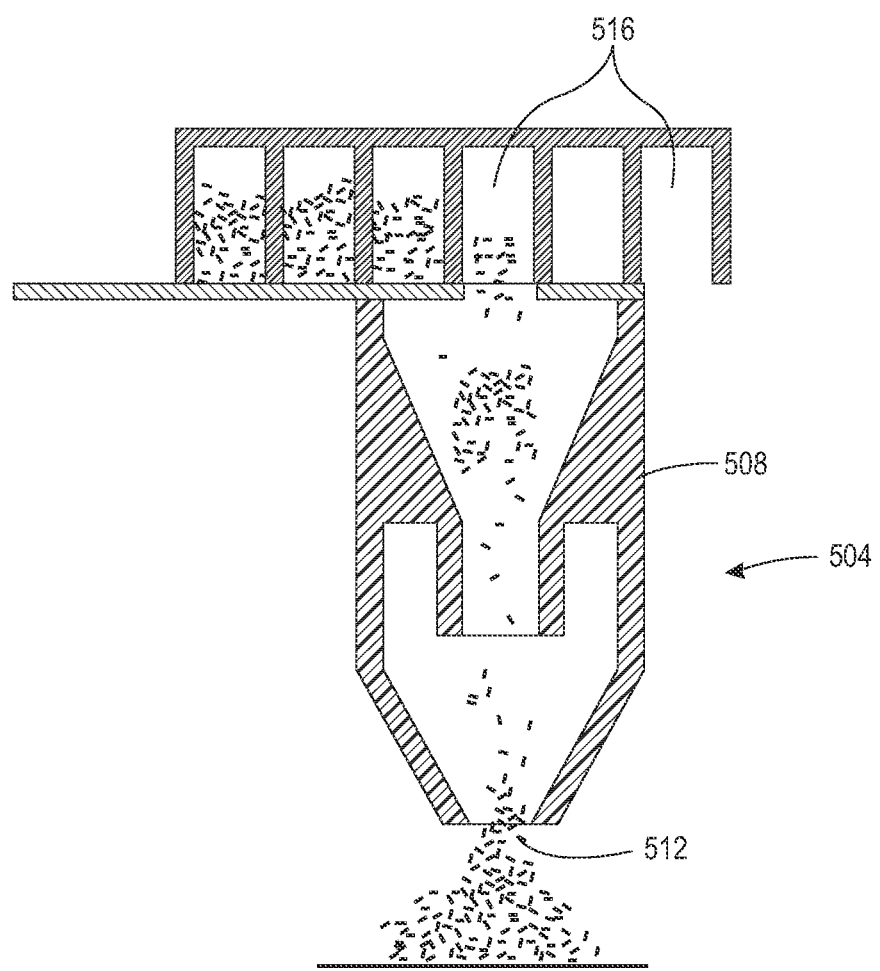
FIG. 5 is an illustration of a fiber dispenser that can be used in the embodiment shown in FIG. 3.

In another alternative embodiment of the system shown in FIG. 3, the robotic arm 34 and cutting device 14 are replaced by a fiber dispenser 504 shown in FIG. 5. The dispenser 504 is operatively connected to the actuator 16 so the controller 18 can operate the actuator 16 to position the dispenser 504 in different X, Y positions in various planes above the part 11. The dispenser 504 includes a body 508 that tapers to a nozzle 512. A plurality of bins 516 are configured for selective communication with the interior of the body 508 and nozzle 512. When a bin 516 is moved to a position that enables the bin to communicate with the interior of the body 508 and the nozzle 512, short individual fibers stored within the bin pass through the body 508 and exit through the nozzle 512. Thus, by operating the actuator 16 to position the nozzle 512 above a position over a cured photopolymer layer where fibers are to be positioned and then moving a bin 516 to a position that enables the fibers to be discharged through the nozzle 512, fibers can be deposited on the part 11. Additional layer(s) can then be applied to the fibers and adjusted for imperfections in the top surface with a roller or leveler as explained above.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A system for forming a three-dimensional structure using an additive manufacturing method comprising:
   a substrate;
   a plurality of ejectors configured to eject drops of photopolymer material towards the substrate;
   a source of ultraviolet (UV) radiation that emits radiation to at least partially cure the photopolymer material ejected from the plurality of ejectors;
   an actuator configured to position mesh sheets onto the photopolymer material that has been ejected toward the substrate and is supported by the substrate;
   a cutting device;
   a source of image data configured to generate image data corresponding to a shape of an uppermost layer of the ejected photopolymer material supported by the substrate; and
   a controller operatively connected to the plurality of ejectors, the source of UV radiation, the cutting device, the source of image data, and the actuator, the controller being configured to:
      operate at least one ejector in the plurality of ejectors to form at least one layer of the photopolymer material supported by the substrate,
      operate the source of UV radiation to cure the at least one layer of photopolymer material at least partially;
      operate the cutting device using the image data corresponding to the shape of the uppermost layer of the ejected photopolymer material supported by the substrate that was generated by the source of image data to cut a mesh sheet to produce at least one portion from the mesh sheet having a shape that corresponds to at least a portion of the shape of the uppermost layer of the ejected photopolymer material supported by the substrate;

operate the actuator to position the at least one portion from the mesh sheet on a top surface of the uppermost layer of the ejected photopolymer material supported by the substrate at a location that corresponds to the shape of the at least one portion from the mesh sheet; and operate the plurality of ejectors to eject additional photopolymer material onto the at least one portion from the mesh sheet to form at least one other layer of photopolymer material on the at least one portion from the mesh sheet and the uppermost layer of the ejected photopolymer material supported by the substrate.

2. The system of claim 1, the source of image data further comprising:

an optical sensor configured to generate the image data corresponding to the shape of the uppermost layer of the ejected photopolymer material supported by the substrate; and the controller is further configured to generate signals for operating the cutting device using the image data generated by the optical sensor that corresponds to the shape of the uppermost layer of the ejected photopolymer material supported by the substrate.

3. The system of claim 1, the controller being further configured to:

operate the plurality of ejectors to form the at least one other layer of photopolymer material supported by the substrate using image data generated by the source of image data that corresponds to the at least one portion from the mesh sheet on the top surface of the uppermost layer of the ejected photopolymer material supported by the substrate.

4. The system of claim 1, the cutting device further comprising:

a laser configured to cut the at least one portion from the mesh sheet.

5. The system of claim 1, the cutting device further comprising:

a blade configured to cut the at least one portion from the mesh sheet.

6. The system of claim 1 further comprising:

a second actuator; and the controller being operatively connected to the second actuator, the controller being further configured to operate the second actuator to press a plate or a roller into the at least one other layer and the at least one portion from the mesh sheet to level a top surface of the at least one other layer and the at least one portion from the mesh sheet.

7. The system of claim 1 further comprising:

a leveler; and the controller being operatively connected to the leveler, the controller being further configured to operate the leveler to remove a portion of the at least one other layer of the photopolymer material.

8. The system of claim 1 wherein the actuator is a robotic arm configured to position the at least one portion from the mesh sheet from a position at the cutting device onto the top surface of the uppermost layer of the ejected photopolymer material supported by the substrate.

9. The system of claim 8, the controller being further configured to operate the robotic arm to orient a first portion of the least one portion from the mesh sheet in a first orientation before positioning the first portion of the at least one portion from the mesh sheet on the top surface of the uppermost layer of the ejected photopolymer material supported by the substrate; and operate the robotic arm to orient a second portion of the at least one portion from the mesh sheet in a second orientation that is different than the first orientation before positioning the second portion of the at least one portion from the mesh sheet on the top surface of the uppermost layer of the ejected photopolymer material supported by the substrate.

* * * * *